United States Patent [19]

Cross et al.

[11] 4,400,193
[45] Aug. 23, 1983

[54] METHOD OF THERMAL TOUGHENING OF GLASS IN A FLUIDIZED BED

[75] Inventors: Raymond P. Cross, Preston; Gordon T. Simpkin, Ormskirk, both of England

[73] Assignee: Pilkington Brothers Limited, Great Britain

[21] Appl. No.: 86,322

[22] Filed: Oct. 19, 1979

Related U.S. Application Data

[63] Continuation of Ser. No. 934,728, Aug. 21, 1978, abandoned.

[30] Foreign Application Priority Data

Aug. 17, 1978 [GB] United Kingdom ............... 33759/78

[51] Int. Cl.³ ............................................. C03B 27/00
[52] U.S. Cl. ...................................... 65/114; 65/104; 65/116
[58] Field of Search .................. 65/104, 111, 114, 116

[56] References Cited

U.S. PATENT DOCUMENTS

| 3,075,580 | 1/1963 | Davis, Jr. | 165/104 F |
| 4,066,430 | 1/1978 | Franz | 65/114 X |
| 4,113,458 | 9/1978 | Cross | 54/114 |
| 4,120,681 | 10/1978 | Cross et al. | 65/111 X |
| 4,300,936 | 11/1981 | Quillevere et al. | 65/114 |

OTHER PUBLICATIONS

Annealing & Fluidized-Bed Quenching of Nimonic-Alloy Sheet, Sep. 62, "Sheet Metal Industries", by I. Astley & W. Merrett.
Advanced Inorganic Chemistry, M.I.T., Cambridge, Mass., p. 439, 2nd Revised Edition by F. A. Cotton & G. Wilkinson, 1966, Interscience Publishers.
Comprehensive Inorganic Chemistry, Pergamon Press, pp. 1032–1036 (after 1972).

*Primary Examiner*—Arthur D. Kellogg
*Attorney, Agent, or Firm*—Burns, Doane, Swecker & Mathis

[57] ABSTRACT

Glass is heated to a temperature above its strain point and is thermally toughened by chilling with a quiescent gas-filuidized particulate material which has gas-generating properties and a mean particle size in the range 30 μm to 120 μm, a particle size distribution in the range 1.15 to 2.78, a flowability in the range 69.5 to 92, and a thermal capacity per unit volume at minimum fluidization in the range 0.7 to 1.59 MJ/m³K.

The invention is particularly suitable for thermally toughening glass sheets for vehicle windscreens.

5 Claims, 1 Drawing Figure

U.S. Patent
Aug. 23, 1983
4,400,193
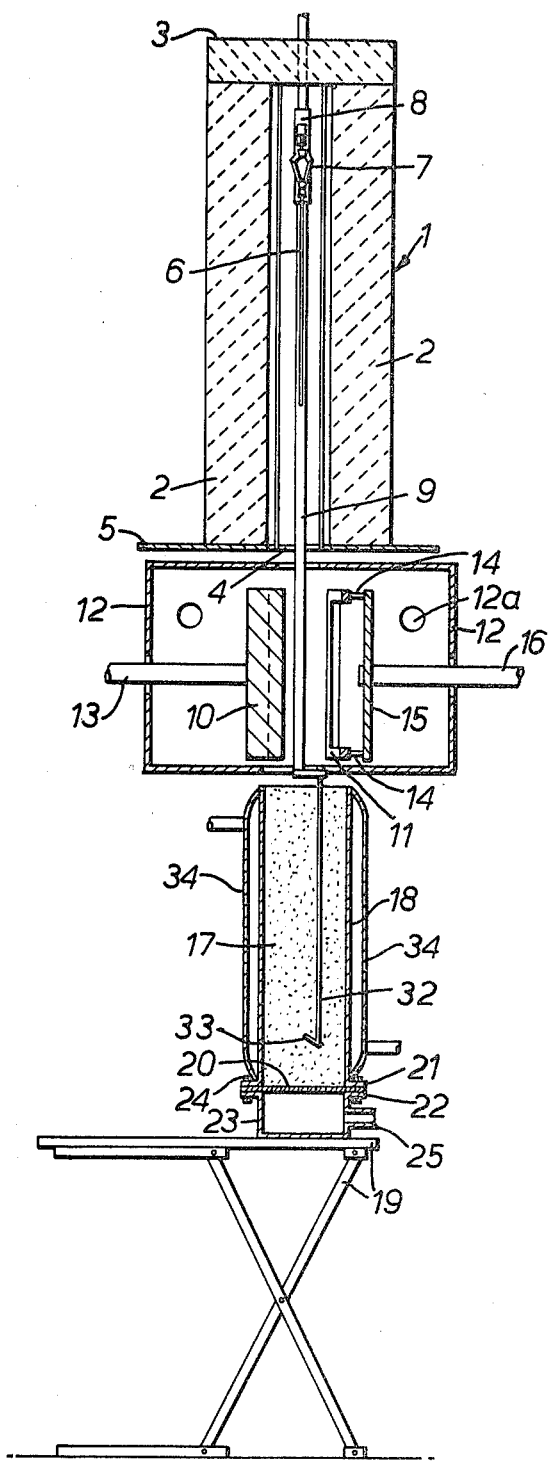

METHOD OF THERMAL TOUGHENING OF GLASS IN A FLUIDIZED BED

This is a continuation, of application Ser. No. 934,728 now abandoned, filed Aug. 21, 1978.

BACKGROUND OF THE INVENTION

1. Field of the Invention

This invention relates to the thermal toughening of glass by contacting te glass with a fluidised bed of particulate material whose teperature, relative to the temperature of the glass, is such that there is heat-exchange between the glass and the particulate material.

More particularly the invention relates to the thermal toughening of glass articles, for example flat or curved glass sheets, by immersing the articles in a fluidised bed of particulate material.

2. Description of the Prior Art

In U.S. Pat. No. 4,113,458 there are described a method and apparatus for thermally treating glass articles by quenching the articles, in turn, in a gas-fluidised bed of particulate material which is placed in a quiescent uniformly expanded state of particulate fluidisation by control of the distribution of fluidising gas in the particulate material at a gas flow velocity through the particulate material between that velocity corresponding to incipient fluidisation and that velocity corresponding to maximum expansion of the particulate material.

The method of this application is particularly efficacious for the thermal toughening of flat or curved sheets of glass which are at a temperature above the strain point of the glass, and are immersed in the fluidised bed where heat exchange with the fluidised particulate material engenders toughening stresses in the glass. This method has been employed for the thermal toughening of curved sheets of glass which are to be used as one component of a laminated glass automobile windscreen.

The quiescent surface of the bed which the hot glass sheet enters ensures that the lower edge of the sheet is uniformly chilled as the lower edge of the sheet enters the fluidised bed.

As the hot glass sheet enters the particulate material there is agitation of the particulate material in the vicinity of the glass surfaces which ensures that there is adequate heat transfer away from the glass surfaces into the bulk of the fluidised bed, dependent on the rate of movement of particles which have become heated in proximity to the glass surfaces away from the vicinity of the glass surfaces with the concurrent supply of cooler particles into the vicinity of the glass surfaces from the bulk of the fluidised bed.

It has now been discovered that materials such as the porous $\gamma$-aluminas and the porous aluminosilicates as disclosed in U.S. Pat. No. 4,113,458 are particularly effective for the thermal toughening of glass because such materials have gas-evolution properties when heated. These materials hve water adsorbed in their pores and the gas driven off is water vapour when the particulate material is heated in the vicinity of the glass surfaces.

The release of gas from such particulate materials when heated in the vicinity of the glass surfaces is now considered to be a basic fctor in producing the rapid agitation of the particulate material which occurs at the glass surfaces when the glass is toughened by immersion in such materials. The rapid agitation ensures that there is a sufficient amount of heat transfer from the glass surfaces into the bulk of the fluidised bed to give the higher values of central tensile stress which it was found possible to induce in glass sheets.

The selection of a material having gas-generating properties is not however sufficient in itself for the attainment of higher toughening stresses and other factors are involved. It has now been found that in order to obtain full benefit from the use of a material having gas-generating properties, which material is maintained in a quiescent uniformly expanded state of particulate fluidisation, it is important to select the mean particle size, particle size distribution, and the flowability of the material, as defined below.

The generation of gas from the particulate material can then induce a sufficient rapidity of movement of the particulate material in the vicinity of the glass surfaces to maximise heat transfer by movement of heat particles away from the glass surfaces while cooler particles are supplied continuously from the bulk of the fluidised material into the vicinity of the glass surfaces.

The "flowability" of a particulate material can be expressed as a number which is the sum of four point scores which are awarded to the material by assessment of four characteristics of the particulate material, and the term "flowability" when used herein has that meaning.

These four characteristics of a flowable particulate material and the manner of awarding point scores are described in the article "Evaluating Flow Properties of Solids" by Ralph L. Carr Jr., Chemical Engineering Volume 72, Number 2, Jan. 18, 1965 and are as follows:

1. Compressibility $= 100(P-A)/P\%$ where $P =$ packed bulk density and $A =$ aerated bulk density 2. Angle of Repose: this is the angle in degrees between the horizontal and the slope of a heap of the particulate material dropped from a point above the horizontal until a constant angle is measured.

3. Angle of Spatula: a spatula is inserted horizontally into the bottom of a mass of the dry particulate material and is lifted straight up and out of the material. An average value of the angle in degrees to the horizontal of the side of the heap of material on spatula is the Angle of Spatula.

4. Particle Size Distribution (called Uniformity Coefficient in the above mentioned article): this is described in the above mentioned article as the numerical value arrived at by dividing the width of sieve opening (i.e. particle size) which will pass 60% of the particulate material by the width of sieve opening which will just pass 10% of the particulate material.

All the values of particle size distribution referred to herein were measured in known manner by an equivalent method using a Coulter counter to determine the particle diameters appropriate to cumulative weight percentages of 40% and 90% corresponding to widths of sieve openings which will pass 60% and will just pass 10% of the particulate material.

The numerical values of Compressibility, Angle of Repose, and Angle of Spatula were measured using a Hosokawa Powder Tester manufactured by the Hosokawa Micrometrics Laboratory of The Hosokawa Iron Works, Osaka, Japan, which Powder Tester is specifically designed for use in the determination of the "flowability" of powders as defined above.

SUMMARY

According to the invention there is provided a method of thermally treating glass comprising heating the glass to a temperature above its strain point, and chilling the hot glass with a gas-fluidised particulate material in a quiescent uniformly expanded state of particulate fluidisation, which material has gas-generating properties and a mean particle size in the range 30 µm to 120 µm, a particle size distribution in the range 1.15 to 2.78, a flowability in the range 69.5 to 92, and thermal capacity per unit volume at minimum fluidisation in the range 0.7 to 1.59 MJ/m$^3$K.

Preferably the particulate material is capable of evolving from 4% to 34.5% of its own weight of gas when heated to constant weight at 800° C.

The particulate material may be γ-alumina which has a mean particle size in the range 32 µm to 119 µm, a particle size distribution in the range 1.21 to 2.34, a flowability in the range 72.25 to 92, and a thermal capacity per unit volume at minimum fluidisation in the range 0.85 to 1.18 MJ/m$^3$K.

The particulate material may be aluminium trihydrate (Al$_2$O$_3$.3H$_2$O) having a mean particle size in the range 62 to 86 µm, a particle size distribution in the range 1.64 to 2.73, a flowability in the range 69.5 to 82, and a thermal capacity per unit volume at minimum fluidisation in the range 1.52 to 1.59 MJ/m$^3$K.

The particulate material may be aluminium monohydrate (Al$_2$O$_3$.1H$_2$O) having a mean particle size in the range 45 to 57 µm, a particle size distribution in the range 1.15 to 2.78, a flowability in the range 74 to 80, and a thermal capacity per unit volume at minimum fluidisation in the range 1.156 to 1.181 MJ/m$^3$K.

Other particulate materials which may be used in carrying out the invention are a porous aluminosilicate; or hydrated iron oxide (FeO.OH) containing combined water of crystallisation; or magnesium hydroxide containing combined water of crystallisation.

The invention also comprehends a thermally toughened glass sheet produced by the method of the invention.

BRIEF DESCRIPTION OF THE DRAWING

Some embodiments of the invention will now be described, by way of example, with reference to the accompanying drawing which illustrates diagramatically a vertical section through apparatus for carrying out the method of the invention.

DESCRIPTION OF THE PREFERRED EMBODIMENT

Referring to the drawing, a vertical toughening oven indicated generally at 1 has side walls 2 and a roof 3. The side walls 2 and the roof 3 are made of the usual refractory material and the bottom of the oven is open, being defined by an elongated aperture 4 in a baseplate 5 on which the oven 1 is supported. A movable shutter, not shown, is provided in known manner to close the aperture 4.

A sheet of glass 6 to be curved and subsequently thermally toughened is suspended in the oven 1 by tongs 7 which engage the upper margin of the sheet 6 and are held closed in customary manner by the weight of the glass sheet gripped between the tong points. The tongs 7 are suspended from a tong bar 8 which is suspended from a conventional hoist, not shown, and which runs on vertical guide rails 9 which extend downwardly from the oven to guide the lowering and raising of the tong bar 8.

A pair of bending dies 10 and 11 are located on either side of the path of the glass sheet 6 in a chamber 12, which is heated by hot gas flows through ducts 12a. The interior of the chamber 12 and the dies 10 and 11 are maintained at the same temperature as the temperature of the hot glass sheet 6 as it enters the chamber 12.

The die 10 is a solid male die mounted on a ram 13 and has a curved front face which defines the curvature to be imposed on the hot glass sheet. The die 11 is a ring frame female die carried by struts 14 mounted on a backing plate 15 which is mounted on a ram 16. the curvature of the die frame 11 matches the curvature of the face of the male die 10.

The guide rails 9 extend downwardly through the chamber 12 to either side of the bending dies towards a container for a gas-fluidised bed 17 of particulate refractory material in which the hot bent glass sheet 6 is quenched by lowering the sheet downwardly into the bed.

The particulate material is a material which has gas-generating properties and a mean particle size in the range 30 to 120 µm, a particle size distribution in the range 1.15 to 2.78, a flowability in the range 69.5 to 92, and thermal capacity per unit volume at minimum fluidisation in the range 0.7 to 1.59 MJ/m$^3$K. Preferably the particulate material is capable of evolving from 4% to 34.3% of its own weight of gas when heated to constant weight at 800° C.

The container for the fluidised bed comprises an open-topped rectangular tank 18 which is mounted on a scissors-lift platform 19. When the platform 19 is in its raised position the top edge of the tank 18 is just below the bending dies 10 and 11.

A micro-porous membrane 20 extends across the base of the tank 18. The edges of the membrane 20 are fixed between a flange 21 on the tank and a flange 22 on a plenum chamber 23 which forms the base of the tank. The flanges and the edges of the plate 20 are bolted together as indicated at 24. A gas inlet duct 25 is connected to the plenum chamber and fluidising air is supplied to the duct 25 at a regulated pressure. The membrane is so constructed that fluidising air flows uniformly into the fluidised bed over the whole base of the bed to maintain the bed in a quiescent uniformly expanded state of particulate fluidisation as described in the above-mentioned patent application.

Particulate material in the tank 18 is maintained in the quiescent uniformly expanded state of particulate fluidisation by the upward flow of air uniformly distributed by the porous membrane 20 to engender a uniform distribution of fluidising air in the particulate material at a gas flow velocity through the particulate material between that velocity corresponding to minimum fluidisation with the particles just suspended in the upwardly flowing air, and that velocity corresponding to maximum expansion of the particulate material in which dense-phase fluidisation is maintained. The expanded bed is in a substantially bubble-free quiescent state with a horizontal quiescent surface through which the glass sheet enters the bed.

The membrane 20 may comprise a steel plate which has a regular distribution of holes, and a number of layers of strong micro-porous paper are laid on the plate 20. For example fifteen sheets of paper may be used. The membrane is completed with a woven wire mesh, for example stainless steel mesh which is laid on top of the paper.

A basket for catching cullet may be located near the plate 20, and is designed so as not to interfere with the uniform flow of fluidising air upwardly from the membrane.

The guide rails 9 extend downwardly to a position below the bending dies and terminate in the region of the upper edge of the tank 18. A fixed frame indicated at 32 is mounted in the tank 18 and has upturned feet 33 at its base to receive the lower edge of a glass sheet lowered into the fluidised bed when the tong bar 8 is lowered beyond the bending dies by the hoist.

With the scissors-lift table 19 lowered and the tongs 7 and tong bar 8 in their lowermost position at the bottom of the guides 9, a glass sheet to be bent and toughened is loaded onto the tongs. The hoist then raises the suspended glass sheet into the oven 1 which is maintained at a temperature, for example 850° C., when toughening soda-lime-silica glass. The glass sheet is rapidly heated to a temperature near its softening point for example a temperature in the range 610° C. to 680° C., e.g. 660° C.

When the glass sheet has reached a required temperature uniformly, the shutter closing the aperture 4 is opened and the hot glass sheet is lowered by the hoist into position between the open bending dies 10 and 11. The rams 13 and 16 are operated and the dies close to curve the sheet to a desired curvature and when the required curvature has been imparted to the sheet, for example to enable the sheet to be used as a component of a laminated windscreen for a motor vehicle, the dies open and the hot curved glass sheet is rapidly lowered into the fluidised bed in the tank 18 which has been raised to quenching position by operation of the scissors-lift table 19 while the glass sheet was being heted in the oven 1.

The fluidised bed is maintained at a suitble temperature for inducing a required central tensile stress in the glass, for example 30° C. to 150° C., by the water cooling jackets 34 on the flat longer walls of the tank 18, and by controlling the temperature of the fluidising air supplied to the plenum chamber 23. The jackets 34 act as a heat sink which absorbs heat dissipated to the remoter parts of the bed by flow of heated particulate material away from the hot glass sheet.

The lower edge of the hot glass sheet is uniformly chilled as the lower edge enters the horizontal quiescent surface of the expanded fluidised bed so that there is no possibility of different stresses being generated in different areas of the surface of that edge of the glass, such as could lead to fracture. During its descent into the bed every part of the lower edge always contacts fluidised material having latent gas-generating properties which is in a quiescent uniformly expanded state of particulate fluidisation, and this uniform treatment of the lower edge, regardless of upward streaming flow of particulate material which may be generated on the hot glass surfaces by gas evolution from the particulate material immediately the glass enters the fluidised bed, largely obviates fracture and the consequent problems of dealing with glass fragments in the bed. This together with the avoidance of losses of glass sheets due to change of shape of the glass sheets and/or damage to the surface quality, ensures a commercially viable yield of toughened glasses of good shape and optical quality.

The rapid evolution and expansion of the gas given off by the particulate material, sets up localised agitation of the particulate material in the vicinity of the glass surfaces, in a manner akin to the boiling of a liquid, and there is streaming flow of particulate material over the glass surfaces.

In order that the fluidised bed shall be in a condition to supply particulate material to the agitated streaming flow at a rate sufficient to maintain the required rapid extraction of heat from the glass surfaces to produce viable centre-to-surface temperature gradients through the thickness of the glass, the particulate material is selected so that the particle size distribution, the mean particle size and the flowability of the powder in the fluidised bed are sufficiently high to produce rapid exchange of particles heated in the vicinity of the glass surfaces with cooler particles from the bulk of the fluidised bed.

It has been found that good results are obtained, in terms of consistent production of relatively high stress in thin glass, for example a central tensile stress in the range from 31 to 47 MPa in glass 2.3 mm thick, by selecting the gas-generating particulate material used so that it has a particle size distribution within the range of from 1.15 to 2.78 and a mean particle size in the range 30 $\mu$m to 120 $\mu$m and a flowability as defined above in the range 69.5 to 92. The selection of suitable characteristics of a particulate material may be achieved by sieving a material which has appropriate gas-generating properties to achieve a required mean particle size, particle size distribution and flowability.

The expansion adjacent the glass surfaces of gas evolved from the particulate material, coupled with the characteristics of the particles imparting to the fluidised material advantageous flow characteristics within the quiescent uniformly expanded state of the bed, ensures that heat transfer away from the glass surfaces into the bulk of the bed continues until well after the glass has cooled below its strain point, with sufficient severity to ensure that the centre-to-surface temperature gradients are maintained through the glass thickness during cooling even though the rate of gas evolution from fresh material reaching the glass and expansion of that gas declines as the glass surfaces cool. Desired relatively high toughening stresses are thus developed during the continuous cooling of the glass while it is immersed in the bed.

The sheet engages the feet 33 of the frame 32 at the bottom of its descent, thereby releasing the tongs 8. The glass sheet then rests on the frame 32 while the glass sheet cools in the fluidised bed. The glass sheet remains in the fluidised bed until it is cooled sufficiently to be handled and the tank 18 is then lowered by lowering the scissors-lift platform to expose the fixed frame 32 and the supported toughened glass sheet which is then removed for subsequent cooling to room temperature.

The other factors which are now thought to influence the stresses induced in the glass which is chilled in a gas-fluidised bed of particulate material having gas-generating properties which is maintained in a quiescent uniformly expanded state of particulate fluidisation, are the mean particle size, the particle size distribution, the flowability and the thermal capacity of the material.

Some examples of operation of the invention are given below using inorganic oxide and hydroxide materials having gas-generating properties, which are selected and/or classified to have characteristics within the ranges just stated. In each of these examples the numerical value of the product of the particle density, in g/cm$^3$, and the mean particle size in $\mu$m is less than 220. This is a criterion which has been used for assessing whether the particulate material is suitable for fluidisation in a quiescent uniformly expanded state of particulate fluidisation, when operating with air at ambient conditions of normal temperature and pressure.

EXAMPLE 1

Sheets of glass of soda-lime-silica composition 2.3 mm thick were cut and the edges of the cut sheets were finished by being rounded using a fine diamond grit wheel. The sheets were suspended from the tongs and were heated to 660° C. in the furnace. When at the required temperature the hot sheets were lowered into a fluidised bed of a selected and/or classified particulate γ-alumina material in a quiescent uniformly expanded state of particulate fluidisation, which bed was maintained at 50° C. Each of the selected γ-alumina materials used was a microporous material having pores from 2.7 to 4.9 nm in diameter and having from 20% to 40% of free pore space. A typical particle density is 1.83 g/cm$^3$. The pores contain adsorbed water and the γ-alumina has a water content in the range from 4% to 10% by weight of the material as measured by weight loss when the material is heated at 800° C. to constant weight. The water is vapourised and released as gas when the particulate material is heated when it contacts the hot glass surfaces.

Table I sets out the result of quenching a glass sheet 2.3 mm thick, heated to 660° C. in twentyone different selected γ-aluminas. The following symbols are used in the column headings:

F = flowability
D = particle size distribution
S = mean particle size (this is subject to experimental scatter and the values given are observed values for the selected materials used)
C = thermal capacity per unit volume at minimum fluidisation (this was derived from the specific heat of the material measured at 50° C. and the density of the material measured at minimum fluidisation of the material)
$\sigma_T$ = central tensile stress induced in the glass

TABLE I

| | F | D | S μm | C MJ/m$^3$K | $\sigma_T$ MPa |
|---|---|---|---|---|---|
| 1 | 72.25 | 1.54 | 34 | 0.99 | 31 |
| 2 | 75.0 | 1.46 | 32 | 0.85 | 35 |
| 3 | 79.0 | 1.24 | 48 | 0.92 | 35 |
| 4 | 80.0 | 1.52 | 46 | 1.06 | 37 |
| 5 | 80.5 | 2.0 | 59 | 1.02 | 35 |
| 6 | 81.5 | 1.81 | 68 | 1.04 | 37 |
| 7 | 81.25 | 1.60 | 40 | 0.99 | 37 |
| 8 | 84.0 | 1.9 | 86 | 1.04 | 40 |
| 9 | 84.25 | 1.5 | 49 | 1.02 | 40 |
| 10 | 86.0 | 1.66 | 79 | 1.15 | 41 |
| 11 | 86.25 | 1.60 | 72 | 1.16 | 39 |
| 12 | 86.5 | 1.60 | 69 | 1.01 | 40 |
| 13 | 87.25 | 1.93 | 84 | 1.06 | 41 |
| 14 | 87.5 | 1.34 | 56 | 1.19 | 37 |
| 15 | 88.0 | 1.35 | 84 | 1.18 | 41 |
| 16 | 88.0 | 1.27 | 64 | 1.05 | 42 |
| 17 | 88.0 | 1.68 | 91 | 1.07 | 42.5 |
| 18 | 88.0 | 1.38 | 67 | 1.03 | 36 |
| 19 | 88.75 | 1.46 | 74 | 1.06 | 37 |
| 20 | 90.21 | 2.34 | 119 | 1.09 | 40 |
| 21 | 92.0 | 1.21 | 80 | 1.12 | 42 |

Each of the selected γ-aluminas disclosed in Table I has a classified particle size distribution in the range 1.21 to 2.34, a mean particle size in the range 32 μm to 119 μm and a flowability in the range 72.25 to 92. The range of thermal capacity per unit volume at minimum fluidisation is from 0.85 MJ/m$^3$K to 1.18 MJ/m$^3$K and depends on the particle size distribution and the mean particle size. Generally the larger the particle size distribution and the mean particle size the larger is the thermal capacity of the fluidised material.

Also, the larger the mean particle size, the larger is the flowability for the same particle size distribution, as illustrated by γ-aluminas 1, 4 and 9. In the case of two γ-aluminas 10 and 21 of the same mean particle size, γ-alumina 21 with the smaller particle size distribution has the higher flowability.

The flowabilities of the gas-emitting materials of Table I are such that there is sufficient rapidity of interchange of hot particles from the vicinity of the glass surfaces with cooler particles from the bulk of the bed to result in a central tensile stress in 2.3 mm thick sida-lime-silica glass when quenched at 660° C. of from 31 MPa at the lower flowability limit of 72.25 increasing rapidly with increasing flowability up to 40 MPa at a flowability of 84. The central tensile stress achieved in the part of the flowability range between 84 and of 92 is from 40 to 42.5 MPa.

Other tests showed that γ-aluminas having a flowability less than 72.25 produce a central tensile stress in the glass lower than 30 MPa. The value of central tensile stress falls rapidly with decreasing flowability even though these γ-aluminas have similar gas-generating properties to the γ-aluminas of Table I.

EXAMPLE 2

The same procedure as described in Example 1 was carried out for toughening of 2.3 mm thick soda-lime-silica glass sheets heated to 660° C. and quenched in five selected aluminium trihydrates (Al$_2$O$_3$.3H$_2$O) as detailed in Table II.

The aluminium trihydrates are hydrated aluminas containing chemically bound water of crystallisation a proportion of which is evolved when the material is heated. The water content of all the materials disclosed in Table II was 34.5% by weight of the material as measured by percentage weight loss when heating the material to constant weight at 800° C.

The particle density is 2.3 g/cm$^3$.

TABLE II

| | F | D | S μm | C MJ/m$^3$K | $\sigma_T$ MPa |
|---|---|---|---|---|---|
| 1 | 69.5 | 2.73 | 62 | 1.52 | 45.5 |
| 2 | 75 | 1.80 | 76 | 1.57 | 45 |
| 3 | 77.25 | 1.79 | 78 | 1.59 | 46 |
| 4 | 81.25 | 1.74 | 74 | 1.57 | 47 |
| 5 | 82 | 1.64 | 86 | 1.57 | 46.5 |

These aluminum trihydrates induce higher central tensile stress than the γ-aluminas of Table I, and the stress increases with increasing flowability. The range of flowabilities is from 69.5 up to 82. The range of central tensile stress achieved in 2.3 mm thick soda-lime-silica glass when quenched at 660° C. was from 45 MPa with a material having a flowability of 69.5 to 47 MPa with a material having a flowability of 82.

EXAMPLE 3

The same procedure as described in Example 1 was carried out for toughening of 2.3 mm thick soda-lime-silica glass sheets heated to 660° C. and quenched in four selected aluminium monohydrates (Al$_2$O$_3$.1H$_2$O) as detailed in Table III.

Aluminium monohydrate is a porous material containing combined water of crystallisation and water adsorbed in the pores. The materials used had a percentage water content of 28% by weight as measured by weight loss of the materials when heated to constant weight at 800° C. The combined water of crystallisation represents 15% by weight of the material and the water adsorbed in the pores represents 13% by weight of the material. It is the latter which is mainly evolved as gas when the material is heated. The particle density is 1.6 g/cm$^3$.

TABLE III

|   | F | D | S μm | C MJ/m$^3$K | $\sigma_T$ MPa |
|---|---|---|---|---|---|
| 1 | 74 | 2.78 | 45 | 1.176 | 37.5 |
| 2 | 75.5 | 1.63 | 48 | 1.156 | 37 |
| 3 | 78.75 | 1.15 | 49 | 1.177 | 39 |
| 4 | 80 | 1.18 | 57 | 1.181 | 39 |

These aluminium monohydrates induce central tensile stress in the range 35.7 to 39 MPa for a range of flowabilities from 74 to 80 related to a range of particle size distribution from 1.15 to 2.78, and a mean particle size range of from 45 to 57 μm.

Other materials which could be selected as usable for carrying out the toughening method of the invention are as follows:

A porous aluminosilicate material of particle density 1.6 g/cm$^3$, each particle of which contains 13% by weight of alumina, and having the following characteristics:
Flowability = 82.5
Particle Size Distribution = 1.68
Mean Particle Size = 94 μm
Adsorbed Water Content (weight loss at 800° C.) = 19%
Thermal Capacity per unit volume at minimum fluidisation = 0.7 MJ/m$^3$K Lepidocrocite, which is an hydrated iron oxide (FeO.OH), having a particle density of 4.2 g/cm$^3$, and which contains combined water of crystallisation and has the following characteristics:
Flowability = 72
Particle Size Distribution = 1.60
Mean Particle Size = 40 μm
Water Content (weight loss at 800° C.) = 10%
Thermal capacity per unit volume at minimum fluidisation = 1.38 MJ/m$^3$K Brucite which is a magnesium hydroxide Mg(OH)$_2$ containing combined water of crystallisation, and having the following characteristics:
Flowability = 74
Particle Size Distribution = 1.60
Mean Particle Size = 60 μm
Water Content (weight loss at 800° C.) = 31%
Thermal capacity per unit volume at minimum fluidisation = 1.01 MJ/mHu 3K The particulate materials of Examples 1, 2 and 3 above all have properties within the limits specified above for materials to be employed in methods according to the present invention, namely they all have gas-generating properties, a mean particle size in the range 30 to 120 μm, a particle size distribution in the range 1.15 to 2.78, a flowability in the range 69.5 to 92 and a thermal capacity per unit volume at minimum fluidisation in the range 0.7 to 1.59 MJ/m$^3$K.

These materials were selected and/or prepared as follows.

Potentially suitable materials having gas generating properties were obtained from appropriate manufacturers and samples of such materials were tested. As a result of the tests it was discovered that the manufacturing processes used to produce the samples in the form supplied by the manufacturers were such that in only a small number of the samples the properties mean particle size, particle size distribution, flowability and thermal capacity all lay within the required limits. Where this was so, it was possible to use the materials as purchased. The fact that they had the desired properties resulted from the treatment of the materials in production by the manufacturer by methods such as sieving or air classification. The great majority of the materials were found on testing to be unsuitable and had to be given further treatment by further sieving or air classification to produce further refined materials which were thereby refined further to have properties falling within the specified limits. These further materials were then used in the fluidised beds described in the Examples.

We claim:

1. A method of thermally toughening glass comprising heating the glass to a temperature above its strain point and chilling the hot glass with a gas-fluidised particulate material in a quiescent uniformly expanded state of particulate fluidisation, wherein the particulate material is aluminium trihydrate (Al$_2$O$_3$.3H$_2$O) having a mean particle size in the range 62 to 86 μm, a particle size distribution in the range 1.64 to 2.73, a flowability point score in the range 69.5 to 82, and a thermal capacity per unit volume at minimum fluidisation in the range 1.52 to 1.59 MJ/m$^3$K.

2. A method of thermally toughening glass comprising heating the glass to a temperature above its strain point and chilling the hot glass with a gas-fluidised particulate material in a quiescent uniformly expanded state of particulate fluidisation, wherein the particulate material is aluminium monohydrate (Al$_2$O$_3$.1H$_2$O) having a mean particle size in the range 45 to 57 μm, a particle size distribution in the range 1.15 to 2.78, a flowability point score in the range 74 to 80, and a thermal capacity per unit volume at minimum fluidisation in the range 1.16 to 1.18 MJ/m$^3$K.

3. A method of thermally toughening glass comprising heating the glass to a temperature above its strain point and chilling the hot glass with a gas-fluidised particulate material in a quiescent uniformly expanded state of particulate fluidisation, wherein the particulate material is magnesium hydroxide containing combined water of crystallisation.

4. A method of thermally toughening glass comprising heating the glass to a temperature above its strain point, and chilling the hot glass with a gas-fluidised particulate material in a quiescent uniformly expanded state of particulate fluidisation, wherein the particulate material is a hydrated iron oxide (FeO.OH) containing combined water of crystallisation having a mean particle size in the range 30 μm to 120 μm, a particle size distribution in the range 1.15 to 2.78, a flowability point score in the range 69.5 to 92, and thermal capacity per unit volume at minimum fluidisation in the range 0.7 to 1.59 MJ/m$^3$K.

5. A method of thermally toughening glass comprising heating the glass to a temperature above its strain point, and chilling the hot glass with a gas-fluidised particulate material in a quiescent uniformly expanded state of particulate fluidisation, wherein the particulate material is magnesium hydroxide containing combined water of crystallisation having a mean particle size in the range 30 μm to 120 μm, a particle size distribution in the range 1.15 to 2.78, a flowability point score in the range 69.5 to 92, and thermal capacity per unit volume at minimum fluidisation in the range 0.7 to 1.59 MJ/m$^3$K.

* * * * *